United States Patent [19]

Hansel et al.

[11] Patent Number: 4,815,933

[45] Date of Patent: Mar. 28, 1989

[54] NOZZLE FLANGE ATTACHMENT AND SEALING ARRANGEMENT

[75] Inventors: Harold R. Hansel, Mason; Vincent M. Drerup, Cincinnati, both of Ohio

[73] Assignee: The United States of America as represented by the Secretary of the Air Force, Washington, D.C.

[21] Appl. No.: 122,153

[22] Filed: Nov. 13, 1987

[51] Int. Cl.4 .............................. F04D 29/54
[52] U.S. Cl. ...................... 415/189; 415/217
[58] Field of Search .......... 415/136, 137, 138, 189, 415/190, 191, 201, 216, 217, 218

[56] References Cited

U.S. PATENT DOCUMENTS

| | | | |
|---|---|---|---|
| 2,488,867 | 11/1949 | Judson | 415/217 X |
| 2,609,176 | 9/1952 | Purvis | 417/217 |
| 2,869,821 | 1/1959 | Halford et al. | 415/139 |
| 2,942,844 | 6/1960 | Neate | 415/137 |
| 2,955,800 | 10/1960 | Miller et al. | 415/138 |
| 3,062,499 | 11/1962 | Peterson | 415/137 |
| 3,066,911 | 12/1962 | Anderson et al. | 415/189 |
| 3,205,828 | 9/1965 | Rupp | 415/201 X |
| 3,423,071 | 1/1969 | Noren | 415/189 |
| 3,610,777 | 10/1971 | Wagle | 416/198 |
| 3,765,791 | 10/1963 | Trappmann | 415/131 |
| 3,829,233 | 8/1974 | Scalzo et al. | 415/136 X |
| 3,970,318 | 7/1976 | Tuley | 277/26 |
| 4,274,805 | 6/1981 | Holmes | 415/138 |
| 4,314,793 | 2/1982 | De Tolla et al. | 415/135 |
| 4,318,668 | 3/1982 | Chaplin et al. | 415/135 |
| 4,384,822 | 5/1983 | Schweikl et al. | 415/138 X |
| 4,391,565 | 7/1983 | Speak | 415/189 |
| 4,566,851 | 1/1986 | Comeau et al. | 415/139 |

FOREIGN PATENT DOCUMENTS 52-68611  6/1977 Japan ...................... 415/189

Primary Examiner—Robert E. Garrett
Assistant Examiner—Joseph M. Pitko
Attorney, Agent, or Firm—Jules J. Morris; Donald J. Singer

[57] ABSTRACT

The invention comprises a boltless turbine nozzle and nozzle support assembly that includes a turbine nozzle mounting flange seated in a nozzle seat forming a part of the nozzle support. Pins are used for affixing the nozzle mounting flange to the nozzle support seat and baffles are provided for maintaining the pins in their desired locations. A retaining ring is preferably used to retain the baffles adjacent to the pins. A pressure actuated pliable seal is affixed to the turbine nozzle adjacent to the nozzle seat in order to provide an air seal across the completed assembly.

15 Claims, 1 Drawing Sheet

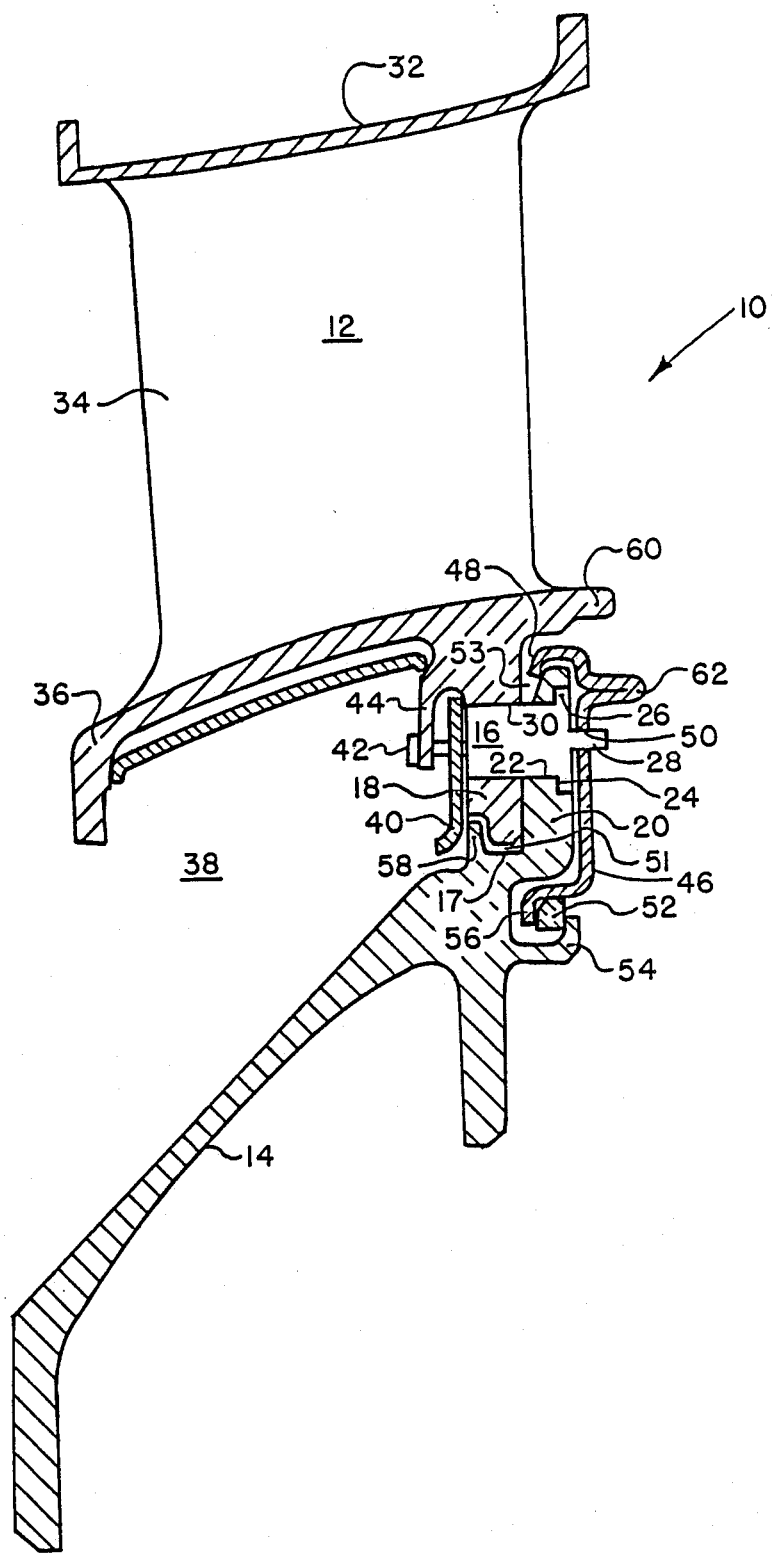

NOZZLE FLANGE ATTACHMENT AND SEALING ARRANGEMENT

STATEMENT OF GOVERNMENT INTEREST

The invention described herein may be manufactured and used by or for the Government for governmental purposes without the payment of any royalty thereon.

TECHNICAL FIELD

This invention relates to gas turbine engines and specifically to mounting arrangements for turbine nozzles.

BACKGROUND OF THE INVENTION

The high pressure turbine nozzle of a gas turbine engine performs an aerodynamic function in that it accelerates and directs the hot gas flow from the combustor into the high pressure turbine rotor. As such, the turbine nozzle experiences large pressure loads due to the reduction in static pressure between the inlet and exit planes. It also experiences high thermal gradients resulting from the interfacing of hot turbine gases and coolant air at the turbine nozzle. The support structure of the turbine nozzle reacts to the pressure loads at the inner and outer flowpath diameters. These loads are transferred out of the nozzle through the cold structures into the engine casings and frame.

The turbine nozzle, which is commonly constructed of nozzle segments of paired vanes, is typically attached by bolts or a combination of bolts and a clamping arrangement to the inner support structure. At the outer flowpath interface, no mechanical retention mechanism is typically used but the pressure load across the nozzle is relied on to maintain contact with the turbine shroud support.

It is important, for reasons of engine performance, that the inner and outer interfaces both provide good air seals. The pressure drop across these interfaces is of similar magnitude to that across the nozzle itself. Any air leaking across the inner or outer interfaces has not been accelerated to the hot gas stream velocity exiting the turbine nozzle and is therefore a chargeable performance loss to the engine. Modern engines make use of chordal or line seals at these locations to allow relative axial motion of the inner and outer structures while maintaining minimal leakage.

There are several problems in executing all of the above required features. Current designs produce relatively complex nozzle assemblies that require unacceptable amounts of time to assemble and disassemble from turbine engines. This results in a substantial contribution to engine down-time during maintenance overhauls where such nozzle segments must be replaced. Further, increased aircraft engine competition and higher engine operating temperatures has raised the standards for engine reliability and time between overhaul. Improved design nozzles are therefore required to withstand high thermal gradients for increased periods without using excessive cooling airflow.

A need therefore exists for an improved nozzle assembly and mounting arrangement that can be easily assembled and disassembled from a turbine engine.

A further need exists for an improved turbine nozzle capable of operating for extended periods between overhaul in modern high temperature engines.

SUMMARY OF THE INVENTION

The invention comprises a boltless turbine nozzle and nozzle support assembly that includes a turbine nozzle mounting flange seated in a nozzle seat forming a part of the nozzle support. Pins are used for affixing the nozzle mounting flange to the nozzle support seat and baffles are provided for maintaining the pins in their desired locations. A retaining ring is preferably used to retain the baffles adjacent to the pins.

In the preferred embodiment of the invention a pressure actuated pliable seal is affixed to the turbine nozzle adjacent to the nozzle seat in order to provide an air seal across the mounting assembly. It is preferred that the pliable seal be affixed to the turbine nozzle by rivets.

A further aspect of the preferred embodiment of the invention comprises a nozzle capture flange positioned on the nozzle support to prevent excessive turbine nozzle axial rotation due to the pressure differential across the turbine nozzle.

Yet another aspect of the preferred embodiment of the invention comprises pins extensions for interfacing with the baffles in order to prevent autorotation of the baffles.

BRIEF DESCRIPTION OF THE DRAWINGS

The foregoing and other objects and advantages of the invention will be apparent from the following more particular description of the preferred embodiment of the invention, as illustrated in the accompanying drawing. The drawing is not necessarily to scale, emphasis instead being placed upon illustrating the principles of the invention.

The FIGURE shows a portion of a gas turbine engine turbine in cross-section and specifically the attachment assembly of a turbine nozzle segment and the turbine nozzle support, the assembly embodying the principles of this invention.

DETAILED DESCRIPTION OF THE INVENTION

FIG. 1 is a cross-sectional view of a portion of the turbine of a gas turbine engine. The turbine nozzle support assembly 10 shown comprises a representative turbine nozzle segment 12 and a nozzle support 14. In this support assembly, embodying the principles of this invention, nozzle segment 12 is assembled to the nozzle support by means of pins 16.

The nozzle support 14 is firmly affixed to the inner structure of the gas turbine engine. The nozzle support comprises a nozzle seat 17 which is U-shaped for a retention of flange 18 of nozzle segment 12. The nozzle support also has a mounting flange 20 having a series of pin holes 22. The pin 16 which is shown installed in pin hole 22, is generally cylindrical with a retention flange 26 and a extended portion 28. The pin is of sufficient length to extend through pin hole 22 of the nozzle support and through hole 30 of the nozzle segments.

The nozzle segment 12 comprises an outer flowpath portion 32, a pair of blades (or vanes) 34, and an inner mount 36. The inner mount supports the blades 34 and encloses a cooling air annulus 38. The mounting flange 18 extends radially inward and is seated in the nozzle seat 17.

The nozzle segment 12 also comprises a pliable seal 40 for sealing the assembly formed of the nozzle support, pins and nozzle segments. The seal 40 is mounted with rivets 42 to a seal flange 44 of the nozzle segment 12. Seal 40 is a pliable seal that is pressure actuated by high pressure air in annulus 38. The relatively high pressure air in annulus 38 tends to press the seal 40 against the pin 16, the mounting flange of the nozzle segment 18, and the nozzle seat 17 of the nozzle support 14. The seal thereby acts to suppress air leakage across these assembled members. It is important to minimize air leakage across the nozzle segment mount assembly in order to prevent a performance loss to the engine system that would occur from high cooling air flow.

The pins 16 which are used to assemble the nozzle segment 12 to the nozzle support 14 are installed from the aft end of the nozzle assembly (right side of the drawing). The pin 16 sits firmly in the pin holes 22 and 30 of the support and nozzle segment respectively. Pin flange 26 mates with step 22 of the nozzle support mounting flange 20 in order to prevent the pins from passing through the assembled mounting flanges. Two pin holes 30 are preferably provided in each nozzle segment 12. The nozzle support 14 has corresponding pin holes for supporting each nozzle segment. The pins thereby supports the nozzle both radially and axially. A larger number of pins can be used per nozzle segment if desired.

The pins 16 are maintained in position from their aft side by the segmented baffles 46. The baffles are shaped with a capture tang 48 to assemble over the top of flange 20 of the nozzle support. They also interlock with pin extensions 28 which extend through holes 50 in the baffles. Some holes 50 in baffles 46 may be slotted in order to allow a degree of tangential freedom in the baffles, since the baffles may operate several hundred degrees hotter than the nozzle support. Some differential thermal growth of the baffle must therefore be allowed relative to the nozzle support. Pin extensions 28 however do provide a degree of tangential locking to prevent uncontrolled or circumferential movement of the baffle segment 46. Uncontrolled movement, or autorotation, of the baffle segments 46 could quickly wear and distort the baffles. The baffles 46 are retained adjacent to the assembly by a 360° retaining ring 52. This retaining ring 52 interlocks with retaining flange 54 of the nozzle support and tang 56 of the baffle. Baffle 46 can made to be spring loaded relative to the support flange 20 through the use of the retainer 52. Spring loading helps to maintain a tight and accurately positioned assembly.

This completed assembly does permit some axial rocking of the nozzle segments 12. Axial movement is required to accommodate relative axial growth of the inner and outer support structures. The mounting flange 18 of the mounting assembly 12 is provided with clearance spaces 51 and 53 so that the nozzle segment 12 can rock within the seat 17 of the nozzle support. A seating flange 58 is provided to limit axial rocking in order to prevent nozzle segment breakout or seal deformation.

The assembly described above provides an easily assembled boltless mounting arrangement. Since no bolts are used to assemble and diassemble the turbine nozzle from the nozzle support, assembly workers can quickly install a turbine nozzle by lifting it into position and inserting pins 16 from the aft side. Baffle segments 46 are simply slid into position on top of the pins 16 and the entire assembly is secured with a retaining ring 52. Pliable seals 40 are permanently assembled to the nozzle segments prior to engine installation and no other further seal pieces are used in this area during final assembly of the turbine nozzle into the engine. Installation and removal of conventional turbine nozzle seals is a particularly difficult assembly operation, which is completely eliminated through the use of this invention.

The elimination of bolts with their relatively large bolt heads permits the manufacture of a turbine nozzle mount positioned further aft relative to the turbine blades 34 then conventional nozzle mounts. By moving the assembly flanges further aft blade cooling is improved since blade overhang away from the cooling air cavity 38 is reduced. Specifically, the cooling air cavity 38 can be extended further aft (to the right) relative to blade 34 to shorten and improve the cooling paths.

Hot air trapped between the mounting flange assembly 10 and the following turbine stage is minimized since the overhang cavity below tang 60 of the nozzle segment is also reduced in size. Back wing 62 of the baffle 46 acts in conjunction with the angel wing of the following turbine stage (not shown) in order to form a partial airseal that reduces the intrusion of hot gas into the cavity between the mounting assembly and the following turbine stage. Reduction in the flow of hot gas into this cavity reduces cooling requirements and extends hardware life.

A further advantage of this assembly stems from reduced air leakage due to improved manufacturing tolerances for the total assembly stack up. This is possible because the assembly of this invention reduces the total number of items required for turbine nozzle assembly as compared to conventional assemblies.

While the invention has been described with reference to the preferred embodiment thereof, it will be understood by those skilled in the art that various change in substance and form can be made therein without departing from the spirit and scope of the invention as described in the appended claims.

We claim:

1. A turbine nozzle and nozzle support assembly comprising:
    a nozzle attachment flange affixed to the turbine nozzle;
    a nozzle seat forming a part of the nozzle support, said nozzle seat for supporting the turbine nozzle at said nozzle attachment flange;
    pins for affixing said nozzle attachment flange to said nozzle seat;
    baffles for maintaining said pins in a desired location; and
    a retaining ring for retaining said baffles adjacent to said pins wherein the nozzle support further comprises a retention flange for holding said retaining ring.

2. The turbine nozzle and nozzle support assembly of claim 1 further comprising seal means for restricting airflow through the assembly.

3. The turbine nozzle support assembly of claim 2 wherein said seal means comprises a pliable leaf seal affixed to said nozzle.

4. The turbine nozzle and nozzle support assembly of claim 1 wherein said pins further comprise pin extensions for preventing autorotation of said baffles.

5. The turbine nozzle and nozzle support assembly of claim 1 wherein the nozzle support further comprises a nozzle capture flange for preventing excessive axial rotation of said turbine nozzle due to pressure differentials across said turbine nozzle.

6. The turbine nozzle and nozzle support assembly of claim 1 wherein said baffles engage said nozzle support, said pins and said retaining ring.

7. The turbine nozzle and nozzle support assembly of claim 1 said nozzle seat is u-shaped and said nozzle attachment flange sits within said u-shaped seat.

8. A nozzle flange attachment assembly comprising:
   (a) a turbine nozzle having an attachment flange including a series of nozzle pin holes;
   (b) a turbine nozzle support comprising:
      (i) a nozzle seat for supporting said turbine nozzle;
      (ii) a series of pin holes, and
      (iii) a retainer lip;
   (c) pins for connecting said turbine nozzle attachment flange to said nozzle support; and
   (d) retainer means placed in said retainer lip for retaining said pins in said pin holes.

9. The nozzle flange attachment assembly of claim 8 wherein said retainer means comprises baffles adjacent to said pins and a retaining ring for retaining said baffles.

10. The nozzle flange attachment assembly of claim 9 wherein said baffles engage said nozzle support, said pins and said retaining ring.

11. The nozzle flange attachment assembly of claim 8 wherein said turbine nozzle further comprises a pliable pressure actuated seal for restricting airflow through the nozzle flange attachment assembly.

12. The nozzle flange attachment assembly of claim 11 wherein said pins further comprise pin extensions which engage adjacent baffles in order to prevent uncontrolled circumferential movement of said baffles.

13. The nozzle flange attachment assembly of claim 8 wherein the nozzle support further comprises a nozzle capture flange for preventing excessive turbine nozzle axial rotation due to pressure differentials across said turbine nozzle.

14. The nozzle flange attachment assembly of claim 8 wherein said nozzle seat is u-shaped and said nozzle attachment flange sits within said u-shaped seat.

15. The nozzle attachment assembly of claim 8 wherein said pins are further characterized by a retention flange for engagement with a support step on said nozzle support in order to prevent said pins from passing through said nozzle support.

* * * * *